United States Patent [19]
Ishida

[11] 3,733,895
[45] May 22, 1973

[54] HIGH SPEED FATIGUE TESTER OF SMALL COILED SPRING WITH VIBRATIONLESS ROTATION-RECIPROCATION DEVICE

[75] Inventor: Kenjiro Ishida, Hamamatsu, Japan

[73] Assignee: President Shizuoka University, Ohya, Shizuoka, Japan

[22] Filed: Sept. 28, 1971

[21] Appl. No.: 184,602

[30] Foreign Application Priority Data

Oct. 1, 1970 Japan.....................45/86496

[52] U.S. Cl......................................73/161, 73/91
[51] Int. Cl..............................G01n 3/26, G01l 1/04
[58] Field of Search....................73/161, 91, 94, 100

[56] References Cited

UNITED STATES PATENTS

| | | | |
|---|---|---|---|
| 2,559,400 | 7/1951 | Clark | 73/161 |
| 2,585,960 | 2/1952 | Nodson | 73/161 |
| 3,209,590 | 10/1965 | Klatchko | 73/91 |

Primary Examiner—Donald O. Woodiel
Attorney—Silverman & Cass

[57] ABSTRACT

A coil spring expansion and contraction apparatus of high speed fatigue tester provides a crank pin to support one end of the spring. The crankshaft is supported by eccentric collar and connected thereto by gears including eccentric gear. Balance mass means are determined to effect theoretical balancing of the apparatus.

1 Claim, 7 Drawing Figures

HIGH SPEED FATIGUE TESTER OF SMALL COILED SPRING WITH VIBRATIONLESS ROTATION-RECIPROCATION DEVICE

BACKGROUND OF THE INVENTION

The present invention relates to a high speed fatigue tester of coiled spring preferably adapted to test small coil springs without causing significant vibration.

Known coil spring testing machine utilizes crank mechanism or cam and roller mechanism to convert circular rotating motion to linear reciprocating motion to afford expansion and contraction movement of the spring to be tested. However, vibrations accompany inevitably to the crank mechanism and cam and roller separate each other at high speed, thus known testing machines are inaccurate at high speed. Further, no spring testing machine is able to test fatigue limit of small coil springs having spring constant 10 - 100 g/mm.

SUMMARY OF THE INVENTION

A primary object of the present invention is to provide a high speed fatigue tester of coiled spring having an improved coil spring expansion and contraction apparatus which is a theoretically balanced and vibrationless rotation to reciprocation mechanism to effect automatic testing of fatigue deformation of a coil spring.

Another object of the present invention is to provide above mentioned coil spring testing machine which is suitable to accurate testing of springs of small spring constant.

A high speed fatigue tester of small coiled spring utilizing vibrationless rotation-reciprocation device, according to the present invention provides an apparatus of expansion and contraction movement of a spring to support one end of the spring to be tested, and means having oscillatable drum which support the other end of the spring to record the deformation of the spring. The spring extraction and contraction apparatus provides a casing, an eccentric collar having a first gear and rotatably supported in the casing and a crankshaft rotatably supported by the eccentric collar at an eccentricity $l$. The crankshaft provides crank arms and a crank pin, the throw of which is the eccentricity $l$. To connect the eccentric collar and the crankshaft, the apparatus provides a second gear secured with the crankshaft, an eccentric gear secured with an input shaft and having the eccentricity $l$ and same number of teeth with the second gear, a third gear secured with the input shaft and having same number of teeth with the first gear, a fourth gear meshing with the first and the third gears. A spring support means is supported by the crank pin. To perform theoretical balancing, the apparatus further provides two rotation balance mass means secured each said crank arm at opposite side of the crank pin and at same distance $d$ from the spring support, point; the rotation balance mass means have mass $m_1$ at distance $f$ from center axis of the crankshaft; two revolution balance mass means are secured with the eccentric collar at same distance along longitudinal axis from the first gear and to reverse direction radially from the axis; the revolution balance mass means have mass $m_2$ and $m_3$ at radial distance $h_2$ and $h_3$ from the axis and axial distance $a$ respectively. The balance mass means are determined to satisfy formulas $$ml + 2m_1l + Ml + m_3h_1 = m_2h_2$$

$$ml = 2mf$$

$$(m + 2m_1 + M)ld = m_3h_1a$$

where, $m$ is unbalance mass of crankshaft, $M$ is rotation mass except $m_1$ and $m_2$, whereby unbalance forces are theoretically balanced to eliminate vibration at spring support means.

Principles, mechanisms, features and advantages of the present invention will become apparent in the following detailed description referring to the accompanying drawings.

Figure 4A:
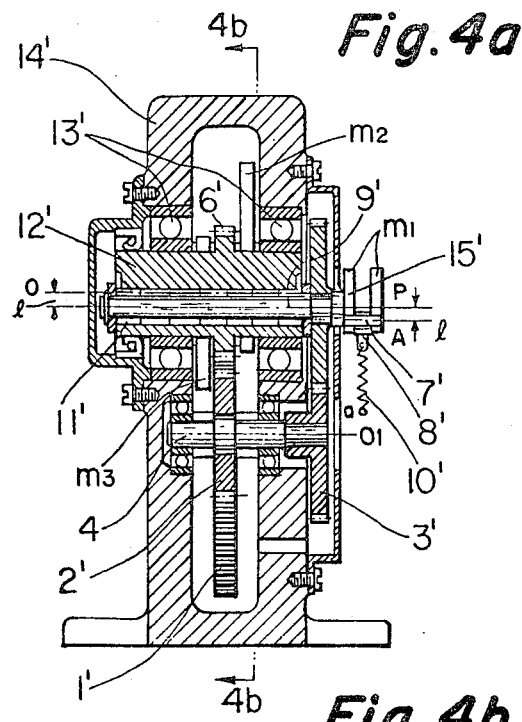
FIG. 4a shows a diagrammatic longitudinal sectional view of an apparatus of expansion and contraction movement of a spring embodying the present invention.
Figure 5:
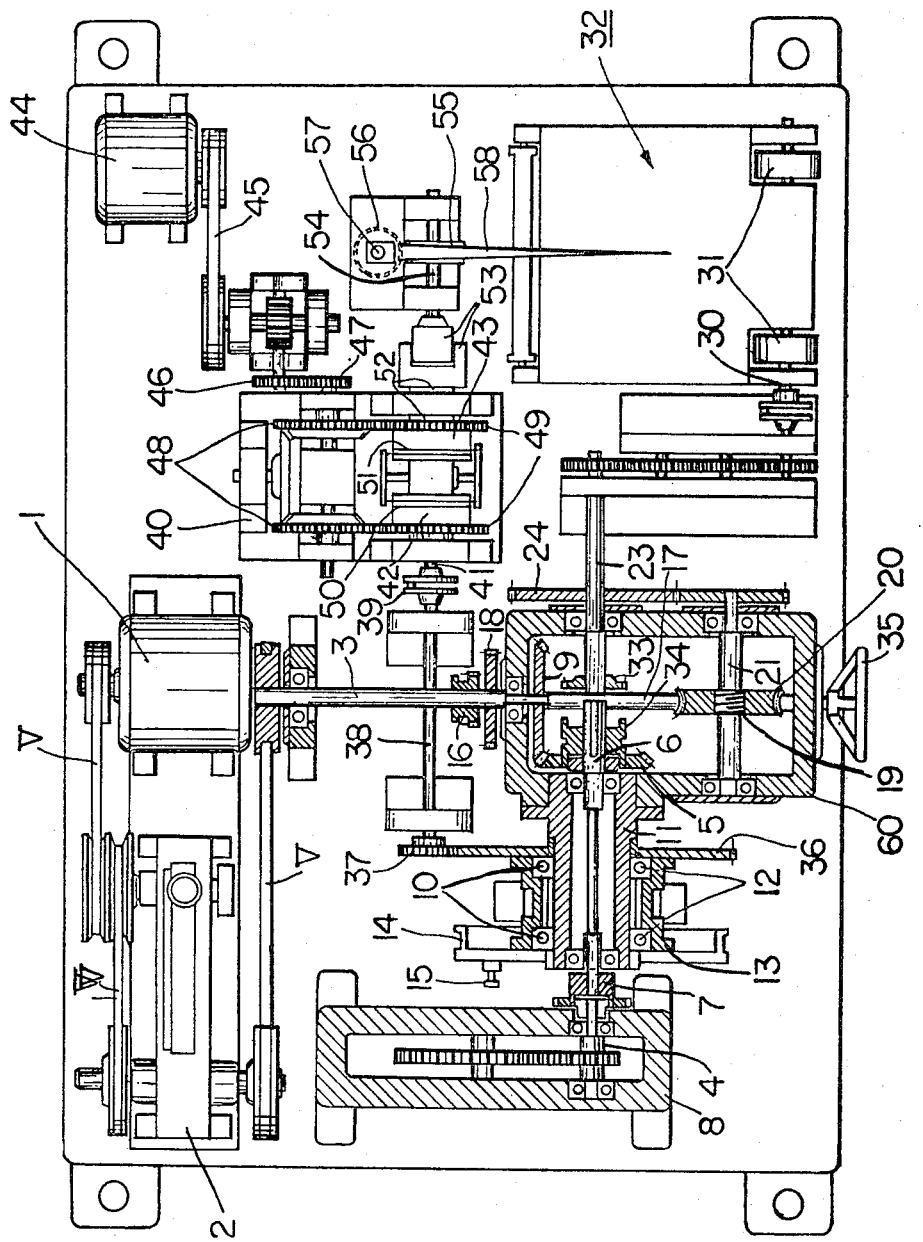
Figure 6:
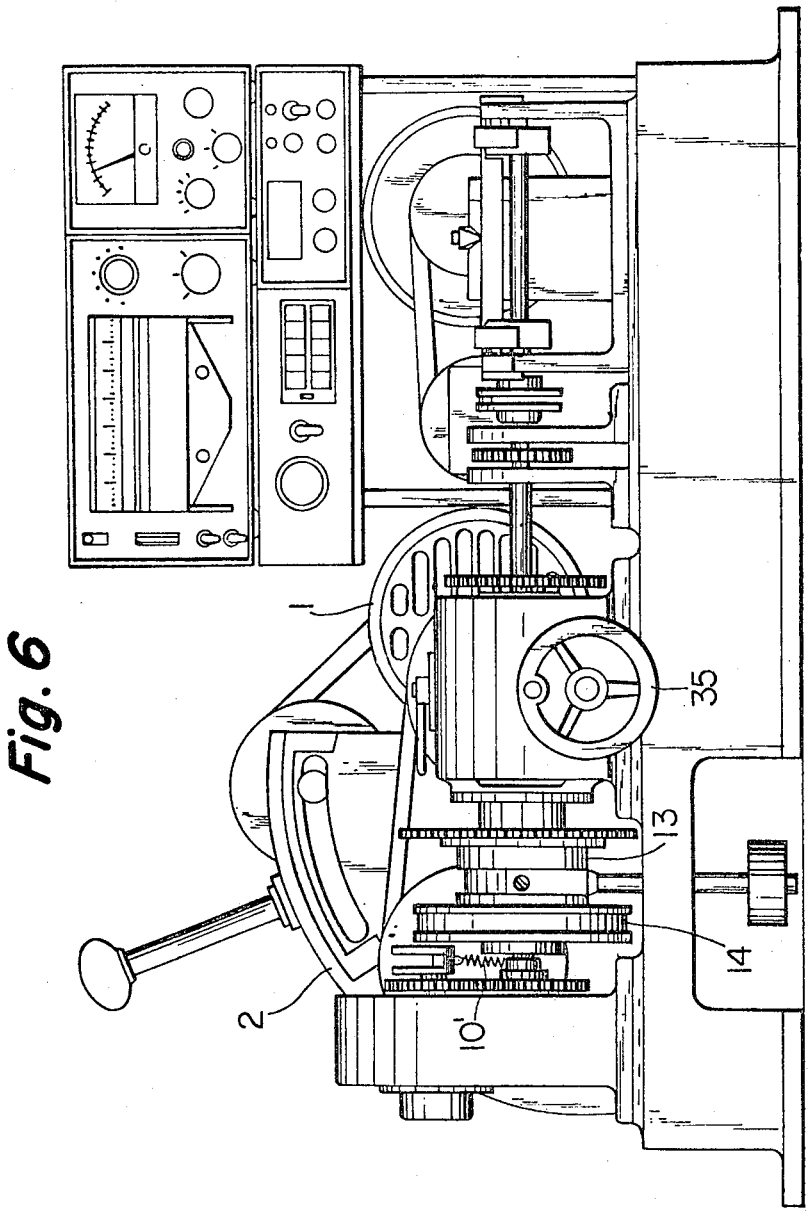

4b shows a diagrammatic sectional view along line 4b—4b of FIG. 4a;

FIG. 5 shows a diagrammatic plan view of a high speed fatigue tester of small coiled spring utilizing vibrationless rotation-reciprocation device embodying present invention; and FIG. 6 shows an elevation of the machine shown in FIG. 5.

DESCRIPTION OF PREFERRED EMBODIMENT

At first, theory and principle about vibrationless linear reciprocating motion utilized as the apparatus of expansion and contraction movement of a spring, according to the present invention, will be explained.

Figure 1:
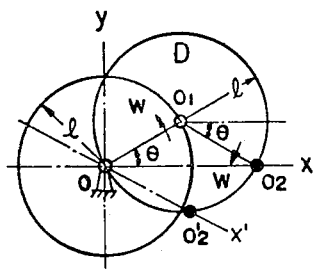
FIG. 1 shows a locus diagram of a point on a disc performing rotation and revolution of the same angular velocity in the reverse directions at the same time.

Theoretical analysis of basic principle about generation of linear reciprocating motion by combining two uniform speed circular motions is as follows:

As shown in FIG. 1, a disc D having radius $l$ rotates on its center $0_1$ at constant angular velocity $\omega$, and at the same time revolves on a point 0 at distance $l$ from the center $0_1$ at same angular velocity $\omega$ in the reverse direction. Then, all point of the disc D at radius $l$ perform linear reciprocating motion. Thus, when a link $0_1 0_2$ rotates on the point $0_1$ at constant angular velocity $\omega$, and at the same time a crank $0 0_1$ rotates at the angular velocity $\omega$ in the reverse direction to effect revolving of the link $0_1 0_2$, the point $0_2$ on the link $0_1 0_2$ perform linear reciprocating motion at stroke $4l$ along line X.

Theoretical analysis to perform perfect balancing of the above mentioned linear reciprocating motion will be described. In the analysis, rotating body is assumed to rotate at constant angular velocity, and frictional forces of the parts and effects of plays between shafts and bearings are assumed to be zero.

Figure 3:
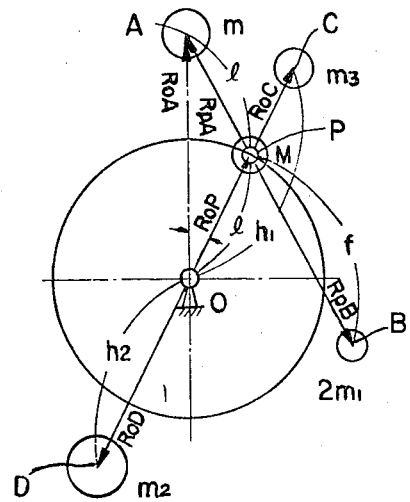
FIG. 3 shows a vector diagram of the points shown in FIG. 2, in which each mass of the moving parts is projected to plane X–Y.

When,

O : center of rotation of crankshaft
P : center of revolution of crankshaft
4 : center of crank pin B : center of gravity of rotation balance mass
C, D: center of gravity of revolution balance masses
$m$ : unbalance mass of crankshaft
$m_1$ : mass of rotation balance mass
$m_2, m_3$: masses of revolution balance mass
M : rotation mass except $m_1$ and $m_2$
$l$ : distance between center O and axis center P
$f$ : distance between center of gravity of rotation balance mass and axis center P
$h_1, h_2$: distances between center O and center of gravity C, D of revolution balance mass.

and, arguments of the position vectors are shown in FIG. 3.

$R_{OP}$ : vector showing position of point P from center O $R_{OA}$ : vector showing position of point A from center O $R_{OC}$ : vector showing position of point C from center O $R_{OD}$ : vector showing position of point D from center O $R_{PA}$ : vector showing position of point A from axis center P $R_{PB}$ : vector showing position of point B from axis center P $\omega$ : constant angular velocity of rotation and revolution $(\dot\theta)$ Inertia forces produced at points A, B, P, C and D are shown as follows:

$$\left.\begin{array}{l} F_A = -m\ddot{R}_{OA} = m(\ddot{R}_{OP}+\ddot{R}_{PA}) = ml\omega^2\left\{e^{i\left(\frac{\pi}{2}-\theta\right)}+e^{i\left(\frac{\pi}{2}+\theta\right)}\right\} \\ F_B = -2m_1(\ddot{R}_{OP}+\ddot{R}_{PB}) = 2m_1\omega^2\left\{le^{i\left(\frac{\pi}{2}-\theta\right)}-fe^{i\left(\frac{\pi}{2}+\theta\right)}\right\} \\ F_P = -M\ddot{R}_{OP} = Ml\omega^2 e^{i\left(\frac{\pi}{2}-\theta\right)} \\ F_C = -m_3\ddot{R}_{OC} = m_3h_1\omega^2 e^{i\left(\frac{\pi}{2}-\theta\right)} \\ F_D = -m_2\ddot{R}_{OD} = m_2h_2\omega^2 e^{i\left(\frac{\pi}{2}-\theta\right)} = -m_2h_2\omega^2 e^{i\left(\frac{\pi}{2}-\theta\right)} \end{array}\right\} \quad (1)$$

For balanced condition, resultant force must be zero, thereby, $$F_A+F_B+F_P+F_C+F_D = \omega^2 \ (ml+2m_1l+Ml+m_3h_1-m_2h_2)$$
$$e^{i(\pi/2-\theta)}=0 \tag{2}$$

$$\therefore ml+2m_1 l+Ml+m_3h_1 = m_2h_2$$
$$ml = 2mf \tag{3}$$

Thus, when formula (3) is satisfied, inertia forces are balanced.

Next, moment of inertia forces also should be balanced.

Moment $M_P$ about axis center P is as follows:

$$M_P = R_{PA}\times F_A + R_{PB}\times F_B = l\omega^2\sin\theta(ml-2m_1f) \tag{4}$$

from formula (3), $ml = 2m_1f$ $$M_P = 0 \tag{5}$$

Similarly, moment $M_O$ about center O is as follows:

$$M_O = R_{OP}\times(F_A+F_B) = l\omega^2\sin2\theta(-ml+2m_1f) \tag{6}$$

also from formula (3)

$$M_O = 0$$

Thus, no unbalance force by moment of inertia force is produced.

Unbalance couple $M_P$ about point P can be converted as unbalance couple $M'_P$ about point O, in the present mechanism $M'_P = -M_P$.

Thus, combined moment M about point O is, $$M = M_O+M'_P = M_O-M_P \tag{7}$$

From formulas (5) and (6), $M=0$. Accordingly, no unbalance couple is produced about point O.

Figure 2:
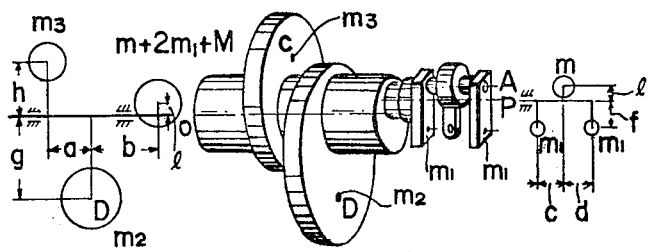
FIG. 2 shows an illustrative perspective view of a spring loading mechanism embodying present perfect-balanced rotation-reciprocation device.

As to balancing of the system when above mentioned masses are distributed along Z axis, balancing condition to balance couple of the device shown in FIG. 2 is as follows:

$$d = c$$
$$(m+2m_1+M)ld = m_3h_1a \tag{8}$$

Thus, when the dimensions and masses are selected to satisfy formulas (3) and (8), the above mentioned device is theoretically perfectly balanced.

As basic principles of the linear reciprocating motion of the spring expansion and contraction apparatus and perfect balancing of the apparatus are shown, one embodiment of perfect balanced rotation reciprocation spring expansion and contraction apparatus is explained hereinafter.

Figure 4B:
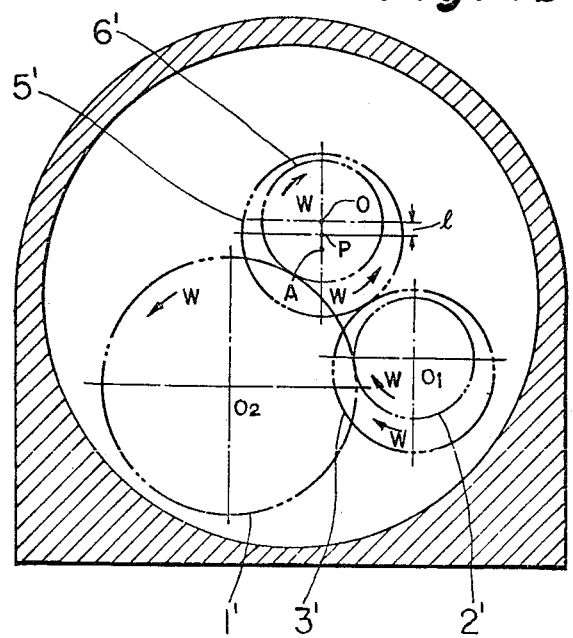

FIGS. 4a and 4b show a coil spring expansion and contraction apparatus utilizing above mentioned perfect balanced rotation reciprocation theory. An input shaft 4 is secured with a gear 2' and also an eccentric gear 3' having eccentricity $l$. The eccentric gear 3' meshes with a gear 5' which is secured with a crankshaft 9' having eccentricity l with the center O of a supporting eccentric collar 12' which in turn securing a gear 6'. The gear 2' meshes with a gear 1' which in turn meshes with the gear 6'. The gears 5' and 3' and the gears 6' and 2' are respectively provided with same number of teeth. Thus, gears 5' and 6' rotate in reverse direction at same angular velocity $\omega$, and point A at $PA = l$ performs linear reciprocating motion at stroke $4l$ along line AO. The crankshaft 9 provides crank arms 15' which are integral with a crank pin 7' supporting a spring hanger 8' to engage one end of coil spring 10' to be tested. The other end $a$ of the spring is engaged with spring support lug 15 secured to a rotatable drum 14 shown in FIG. 5.

The crankshaft 9' is rotatably supported by the eccentric collar 12' through needle bearing means 11' and the eccentric collar 12' is supported through ball bearing means 13' by casing 8 shown in FIG. 5.

The crankshaft 9' provides at crank arms 15' rotation balance mass means $m_1$, and the eccentric collar 12' provides revolution balance mass means $m_2$ and $m_3$ which are selected to satisfy the above mentioned formulas (3) and (8).

The spring expansion and contraction apparatus is perfect balanced rotation reciprocation device and the coil spring to be tested performs linear reciprocation.

FIGS. 5 and 6 show a coil spring testing machine providing the apparatus of expansion and contraction movement of a spring, according to the present invention, shown in FIGS. 4a and 4b.

A main drive motor 1 drives by V-belt V through transmission means 2 a main input shaft 3 which provides a bevel gear 9 at one end. The bevel gear 9 meshes with a bevel gear 5 which drives a cooperating shaft 6 when a clutch shifter 34 is engaged. The shaft 6 is connected through a coupling 7 with the shaft 4 of the spring expansion and contraction apparatus shown in FIGS. 4a and 4b. The shaft 6 is rotatably supported through ball bearings 10 in a bracket 11 which is secured with a gear casing 60. The bracket 11 supports on the periphery through precision ball bearings 12 a drum support 13 which is oscillatable small angle. On one end surface of the drum support 13 a rotatable drum 14 is secured and provide a spring support 15 which supports lower end of the spring 10' described in FIG. 4a.

Mechanical recording section to record spring fatigue deformation will be explained.

When a gear 16 having shifter to slide on the input shaft 3 meshes with a gear 18 secured with a shaft 17 which extends parallel to the shaft 3, a worm 19 at the other end of the shaft 18 rotates to drive a worm wheel 20 secured with a shaft 21 which provides a gear 22 at one end. The rotation of the gear 22 is transmitted through a meshing gear 24, a shaft 23 secured with the gear 24, a gear 25 secured with the shaft 23, idler gears 26 and 27, a gear 28 and a coupling 29 connected with the gear 28 to recorder paper feed shaft 30. The shaft 30 provides feed rollers 31 to feed the recorder paper 32 as shown by arrow. When a joe clutch 33 engages with the clutch shifter 34 which is disengaged with the bevel gear 5, rotation speed of the shaft 6 is lowered, and the bevel gear 5 for high speed drive rotates freely on the shaft 6. To manually operate recorder paper 32, the engagement between the gears 16 and 18 by shifting the gear 16 and a handle 35 at one end of the shaft 17 is manually operated.

Oscillation of the drum 14 caused by the attached spring 10' is transmitted through the drum support 13, a gear 36 secured at the other end of the drum support 13, a gear 37 meshing with the gear 36, a shaft 38 secured with the gear 37 and a coupling means 39 secured with the shaft 38 to an input shaft 41 of multiplier unit 40.

The multiplier unit 40 provides an auxiliary motor 44 which drives through a belt 45 and gears 46, 47 and 48 two multiplier pulleys 42 and 43 to reverse directions each other. Friction belts 50 and 51 retain frictionally the multiplier pulleys 42 and 43 respectively, and according to angle $\alpha$ formed by pulleys 42 and 43 and the friction belts 51 and 52 at contact point effect multiplification of $e^{\mu\alpha}$ times of the input shaft 41 at an output shaft 52; in which, $e$ is base of natural logarithms and $\mu$ is frictional coefficient between the friction belt and the multiplier pulley. The output shaft 52 is connected through a coupling means 53 with a shaft 54 which provides a screw gear 55 meshing with a screw gear 56. The screw gear 56 is secured with a recorder pen 58 through a shaft 57 to effect recording of oscillation caused by the spring testing to the recorder paper 32.

It will be appreciated that the fatigue tester of coiled spring, according to the present invention, is theoretically balanced so that spring can be tested vibrationless at high speed. Also as the stroke is linear reciprocation very accurate fatigue test of small size coil springs can be performed and the fatigue deformation characteristic can be recorded automatically.

I claim:

1. High speed fatigue tester of small coiled spring utilizing vibrationless rotation-reciprocation device including a spring expansion and contraction apparatus to support one end of the spring and means having oscillatable drum which supports the other end of the spring, said spring expansion and contraction apparatus comprising a casing, an eccentric collar having a first gear and rotatably supported in the casing, a crankshaft rotatably supported by the eccentric collar at an eccentricity $l$, crank arms and a crank pin of the crankshaft having a throw of the eccentricity $l$, a second gear secured with the crankshaft, an eccentric gear secured with an input shaft and having said eccentricity $l$ and same number of teeth with the second gear, a third gear secured with the input shaft and having same number of teeth with the first gear, a fourth gear meshing with the first and the third gear, a spring support means supported by the crank arm, two rotation balance mass means secured each said crank arm at opposite side of the crank pin and at same distance $d$ from the spring support point, said rotation balance mass means having mass $m_1$ at distance $f$ from center axis of the crankshaft, two revolution balance mass means secured with said eccentric collar at same distance along longitudinal axis from the first gear and to reverse direction radially from the axis, said revolution balance mass means having mass $m_2$ and $m_3$ at radial distance $h_2$ and $h_1$ from the axis and axial distance $a$ respectively, said balance mass means being determined to satisfy formulas $$ml + 2m_1l + Ml + m_3h_1 = m_2h_2$$

$$ml = 2mf$$

$$(m + 2m_1 + M)ld = m_3h_1a$$

where, $m$ is unbalance mass of crankshaft, $M$ is rotation mass except $m_1$ and $m_2$, whereby unbalance forces are theoretically balanced to eliminate vibration at spring support means.

* * * * *